No. 648,005. Patented Apr. 24, 1900.
M. VILLARET.
DRYING ROOM.
(Application filed Feb. 27, 1899.)
(No Model.)
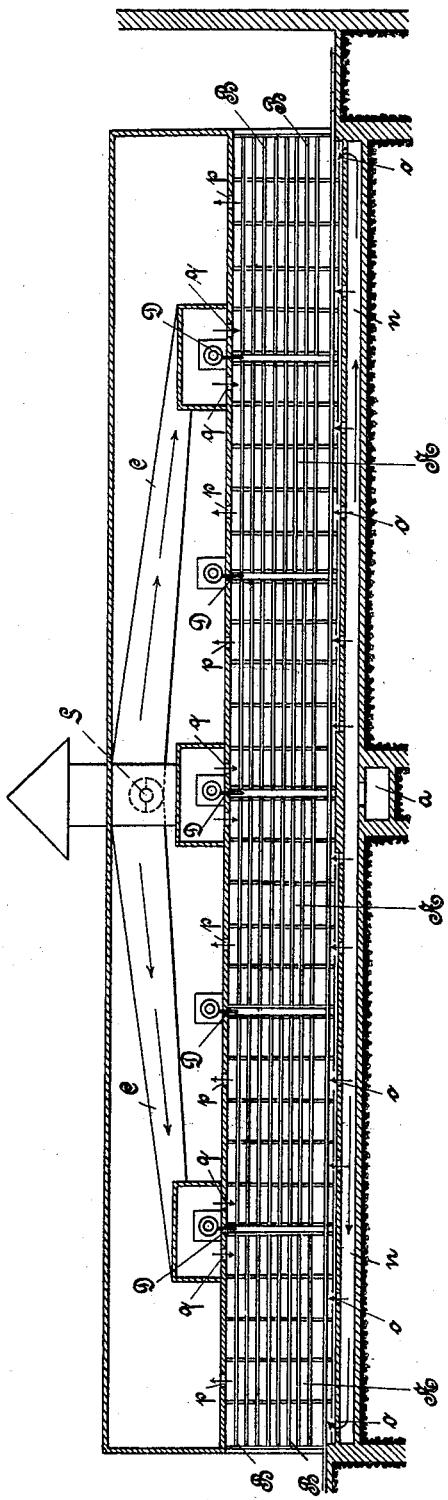
Witnesses:
Theodor Heese
Karl Stupp
Inventor:
Max Villaret
per Brede & Co.
Attorneys

UNITED STATES PATENT OFFICE.

MAX VILLARET, OF WITASZYCE, GERMANY.

DRYING-ROOM.

SPECIFICATION forming part of Letters Patent No. 648,005, dated April 24, 1900.

Application filed February 27, 1899. Serial No. 707,455. (No model.)

*To all whom it may concern:*

Be it known that I, MAX VILLARET, a subject of the King of Prussia, German Emperor, residing at Witaszyce, in the Province of Posen, German Empire, have invented an Improvement in Drying-Rooms, of which the following is a specification.

The invention relates to the drying-rooms for clayware, especially for bricks, and has for its object as much as possible the uniform working of the drying-stream of air upon the clay articles piled up in the several chambers of the drying-room.

In the drawing a longitudinal section through a chamber of the drying-room is represented.

The drying-chamber A is made in the usual way and has the well-known longitudinal ledges B, upon which the boards, with the bricks laid upon them, are placed. The stream of air which is intended to dry the bricks is forced, by means of a fan or the like, through a pipe $a$ and from there into the pipe $n$ underneath the drying-room. From here it passes through the openings $o$ into the interior of the drying-room A. Now this stream, which of course must be warm, has always the tendency immediately to rise. Therefore the drying ware placed near the top of the drying-chamber will always be dried at first. To prevent this, the air leaving the drying-room through the openings $p$ on the top of the room is not led entirely into the open air, but is partially driven back by a fan G, through the openings $q$, into the drying-room. By this arrangement it is attained that the heat of the air leaving the drying-room, which up to date was usually lost, is used again. By leading this air into the drying-room through openings on the top of the same a horizontal circulation of the air is caused, because the air entering through the openings on the top meets the air-stream coming from below through the openings $o$ and prevents this stream from rising immediately. In consequence thereof the drying-stream of air is forced into every part of the drying-chamber and the temperature is nearly the same on the bottom of the drying-room as on the top of the same, so that the drying ware throughout the whole drying-room is always dried uniformly.

What I claim as my invention, and desire to secure by Letters Patent of the United States, is—

In drying-rooms for bricks and the like, the combination with openings on the bottom of the drying-chambers and means for conducting the drying stream of air to such openings, of openings on the top of the drying-chambers, a fan for driving the air leaving these openings back into the drying-chambers, air-flues leading from this fan to places above the drying-chambers and openings on the top of the drying-chambers, connecting the chambers with the places connected with the fan by means of the flues mentioned above.

In testimony whereof I have signed my name to this specification in the presence of two subscribing witnesses.

MAX VILLARET.

Witnesses:
HERRMANN WILLENBERG,
HERMANN BARTSCH.